United States Patent
Keating

(10) Patent No.: US 9,303,597 B2
(45) Date of Patent: Apr. 5, 2016

(54) ENGINE WITH DEDICATED EGR EXHAUST PORT AND INDEPENDENT EXHAUST VALVE CONTROL

(75) Inventor: Edward J. Keating, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 947 days.

(21) Appl. No.: 13/530,210

(22) Filed: Jun. 22, 2012

(65) Prior Publication Data

US 2013/0340728 A1   Dec. 26, 2013

(51) Int. Cl.
*F02M 25/07* (2006.01)
*F02D 13/02* (2006.01)

(52) U.S. Cl.
CPC ....... *F02M 25/0751* (2013.01); *F02D 13/0249* (2013.01); *F02D 13/0257* (2013.01); *F02M 25/0717* (2013.01); *F02M 25/0746* (2013.01); *Y02T 10/121* (2013.01); *Y02T 10/18* (2013.01)

(58) Field of Classification Search
CPC . F02D 13/02; F02D 13/0203; F02D 13/0207; F02D 13/0211; F02D 13/0215; F02D 13/0219; F02D 13/0241; F02D 13/0249; F02D 13/0257; F02D 13/0276; F02M 25/07; F02M 25/0717; F02M 25/0746; F02M 25/0747; F02M 25/0749; F02M 25/0751
USPC .................. 123/90.15, 90.16, 90.17, 568.11, 123/568.21
See application file for complete search history.

(56) References Cited

U.S. PATENT DOCUMENTS

| | | | |
|---|---|---|---|
| 5,417,068 A * | 5/1995 | Olofsson | 60/605.1 |
| 6,347,619 B1 * | 2/2002 | Whiting et al. | 123/568.12 |
| 6,460,337 B1 * | 10/2002 | Olofsson | 60/605.1 |
| 6,742,506 B1 * | 6/2004 | Grandin | 123/568.12 |
| 6,932,062 B2 * | 8/2005 | Kuzuyama et al. | 123/568.13 |
| 7,997,237 B2 * | 8/2011 | Surnilla | 123/21 |
| 8,100,117 B2 | 1/2012 | Riegger et al. | |
| 8,561,599 B2 * | 10/2013 | Gingrich et al. | 123/568.17 |
| 8,601,811 B2 * | 12/2013 | Pursifull et al. | 60/602 |
| 8,627,659 B2 * | 1/2014 | Straub | 60/602 |
| 8,701,409 B2 * | 4/2014 | Pursifull et al. | 60/605.2 |
| 8,769,927 B2 * | 7/2014 | Alger et al. | 60/274 |
| 8,935,917 B2 * | 1/2015 | Hayman et al. | 60/323 |
| 2004/0065278 A1 * | 4/2004 | Nishimoto et al. | 123/58.8 |
| 2004/0168655 A1 * | 9/2004 | Hitomi et al. | 123/58.8 |
| 2005/0066920 A1 * | 3/2005 | Daigo et al. | 123/90.16 |
| 2006/0196178 A1 * | 9/2006 | Caine et al. | 60/324 |
| 2007/0119168 A1 * | 5/2007 | Turner | 60/600 |
| 2009/0084333 A1 * | 4/2009 | Cleary et al. | 123/90.17 |
| 2009/0223220 A1 * | 9/2009 | Vuk | 60/602 |

(Continued)

FOREIGN PATENT DOCUMENTS

| | | |
|---|---|---|
| CN | 101779023 A | 7/2010 |
| DE | 102010045893 A1 | 5/2011 |

(Continued)

*Primary Examiner* — Thomas Moulis
(74) *Attorney, Agent, or Firm* — Quinn Law Group, PLLC

(57) ABSTRACT

An engine assembly includes an engine block defining a cylinder, an exhaust system, and an exhaust gas recirculation system. A first cam-actuated exhaust valve is configured to control the flow of fluid from the cylinder to the exhaust system. A second cam-actuated exhaust valve configured to control the flow of fluid from the cylinder to the exhaust gas recirculation system. The timing of the second valve is adjustable independently of the timing of the first valve, thereby enabling control of EGR flow through manipulation of exhaust valve timing.

9 Claims, 4 Drawing Sheets

(56) References Cited

U.S. PATENT DOCUMENTS

| | | | |
|---|---|---|---|
| 2009/0308070 A1* | 12/2009 | Alger et al. | 60/602 |
| 2010/0116255 A1 | 5/2010 | Hatamura | |
| 2010/0212315 A1* | 8/2010 | Irisawa | 60/602 |
| 2011/0023854 A1* | 2/2011 | Heilenbach et al. | 123/661 |
| 2011/0114067 A1* | 5/2011 | Gonzalez Delgado et al. | 123/568.11 |
| 2011/0167815 A1* | 7/2011 | Ulrey et al. | 60/602 |
| 2011/0203558 A1* | 8/2011 | Pappenheimer | 123/568.18 |
| 2011/0219767 A1* | 9/2011 | Miyashita | 60/600 |
| 2011/0220047 A1 | 9/2011 | Moon et al. | |
| 2012/0023933 A1 | 2/2012 | Ulrey et al. | |
| 2012/0023934 A1* | 2/2012 | Pursifull et al. | 60/605.2 |
| 2012/0023935 A1* | 2/2012 | Pursifull et al. | 60/605.2 |
| 2012/0073288 A1 | 3/2012 | Ulrey et al. | |
| 2012/0285163 A1* | 11/2012 | Hayman et al. | 60/602 |
| 2012/0285426 A1* | 11/2012 | Hayman et al. | 123/563 |
| 2013/0174816 A1 | 7/2013 | Riley et al. | |
| 2013/0269315 A1* | 10/2013 | Ervin et al. | 60/273 |
| 2014/0000552 A1* | 1/2014 | Glugla et al. | 123/295 |
| 2014/0000557 A1* | 1/2014 | Glugla et al. | 123/435 |
| 2014/0013739 A1* | 1/2014 | Gonzalez Delgado et al. | 60/605.2 |
| 2014/0144414 A1* | 5/2014 | Dean et al. | 123/568.14 |
| 2014/0283799 A1* | 9/2014 | Ulrey et al. | 123/568.12 |

FOREIGN PATENT DOCUMENTS

| | | |
|---|---|---|
| JP | 11210449 A | 8/1999 |
| WO | 2010149563 A1 | 12/2010 |

* cited by examiner

ENGINE WITH DEDICATED EGR EXHAUST PORT AND INDEPENDENT EXHAUST VALVE CONTROL

TECHNICAL FIELD

This invention relates to engine assemblies having exhaust gas recirculation.

BACKGROUND

Certain vehicles include an exhaust gas recirculation (EGR) system to selectively direct internal combustion engine exhaust gas to an air inlet of the engine. EGR can lower the level of certain undesirable engine emission components such as nitrogen oxide (NOx) and can improve fuel economy. EGR typically involves recirculation of exhaust gas through an EGR passage between an engine exhaust system and an engine fresh air intake passage. A valve within the EGR passage (the EGR valve) is controlled to vary a restriction within the EGR passage to regulate the flow of exhaust gas therethrough.

SUMMARY

An engine assembly includes an engine block defining a cylinder; a crankshaft; an air intake system; an exhaust system; and an exhaust gas recirculation system. An intake valve is configured to control the flow of fluid from the air intake system to the cylinder. A first exhaust valve is configured to control the flow of fluid from the cylinder to the exhaust system. A second cam-actuated exhaust valve is configured to control the flow of fluid from the cylinder to the exhaust gas recirculation system. A first cam is configured to actuate the first exhaust valve, and a second cam is configured to actuate the second exhaust valve. The second cam is phase adjustable relative to the crankshaft independently of the phase of the first cam relative to the crankshaft. The phasing of the dedicated EGR cam lobe relative to the primary exhaust cam lobe can thus be controlled dynamically in order to control EGR quantity.

The engine assembly provided herein may improve fuel economy through the reliable introduction of external EGR (through the elimination of EGR valves). The engine assembly may also improve EGR response time due to volume minimization and quick response cam phasing.

The above features and advantages and other features and advantages of the present invention are readily apparent from the following detailed description of the best modes for carrying out the invention when taken in connection with the accompanying drawings.

DETAILED DESCRIPTION

Figure 1:
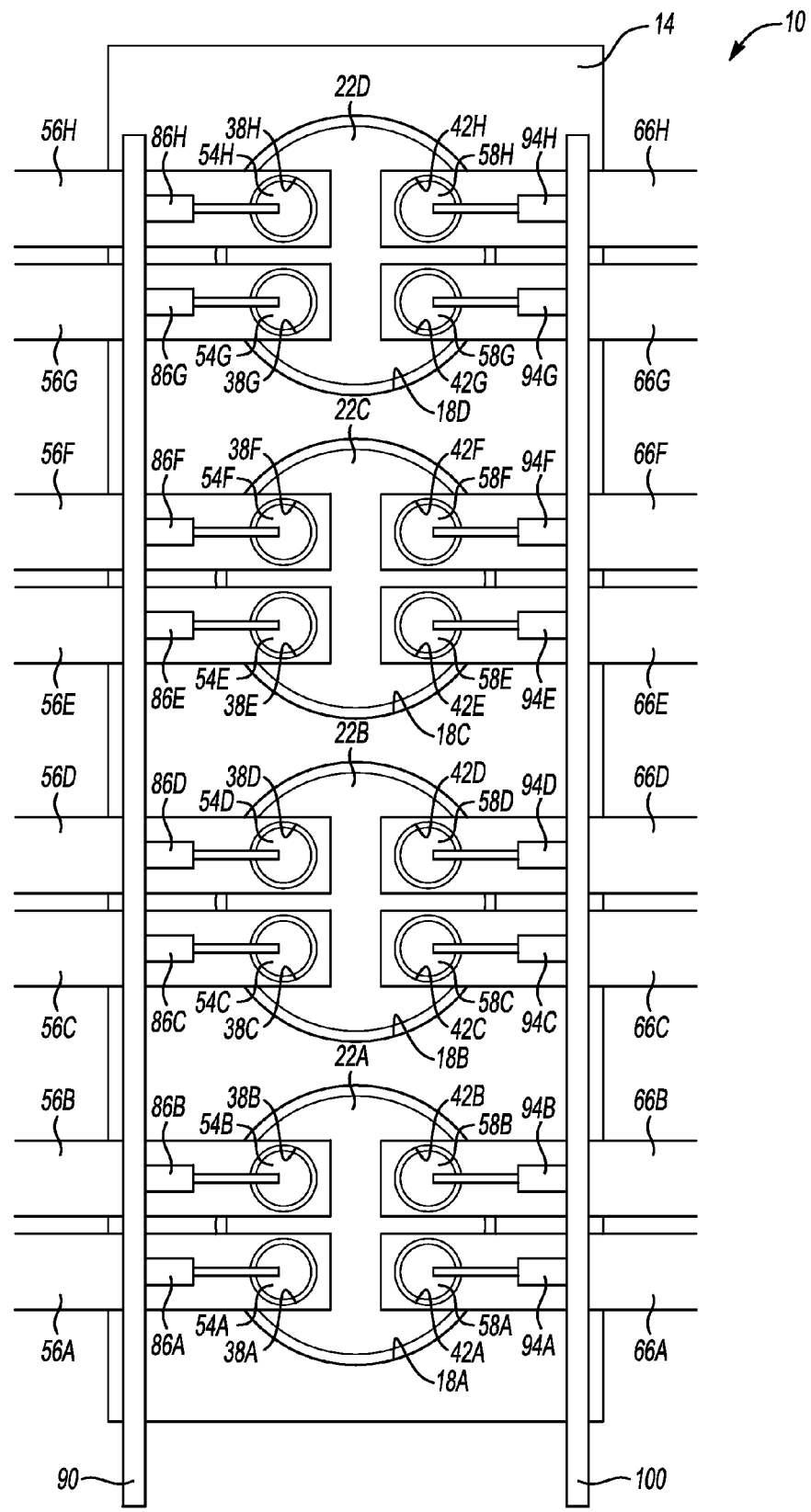
FIG. 1 is a schematic, top view of a portion of an engine assembly.

Referring to the drawings wherein like characters represent the same or corresponding parts throughout the several views, there is seen in FIG. 1 an internal combustion engine 10. The engine 10 includes an engine block 14 defining a plurality of cylinders 18A-D. The engine 10 further includes a plurality of pistons 22A-D. Each piston 22A-D is positioned within a respective one of the cylinders 18A-D for reciprocal translation therein between a top dead center position and a bottom dead center position, as understood by those skilled in the art.

Figure 2:
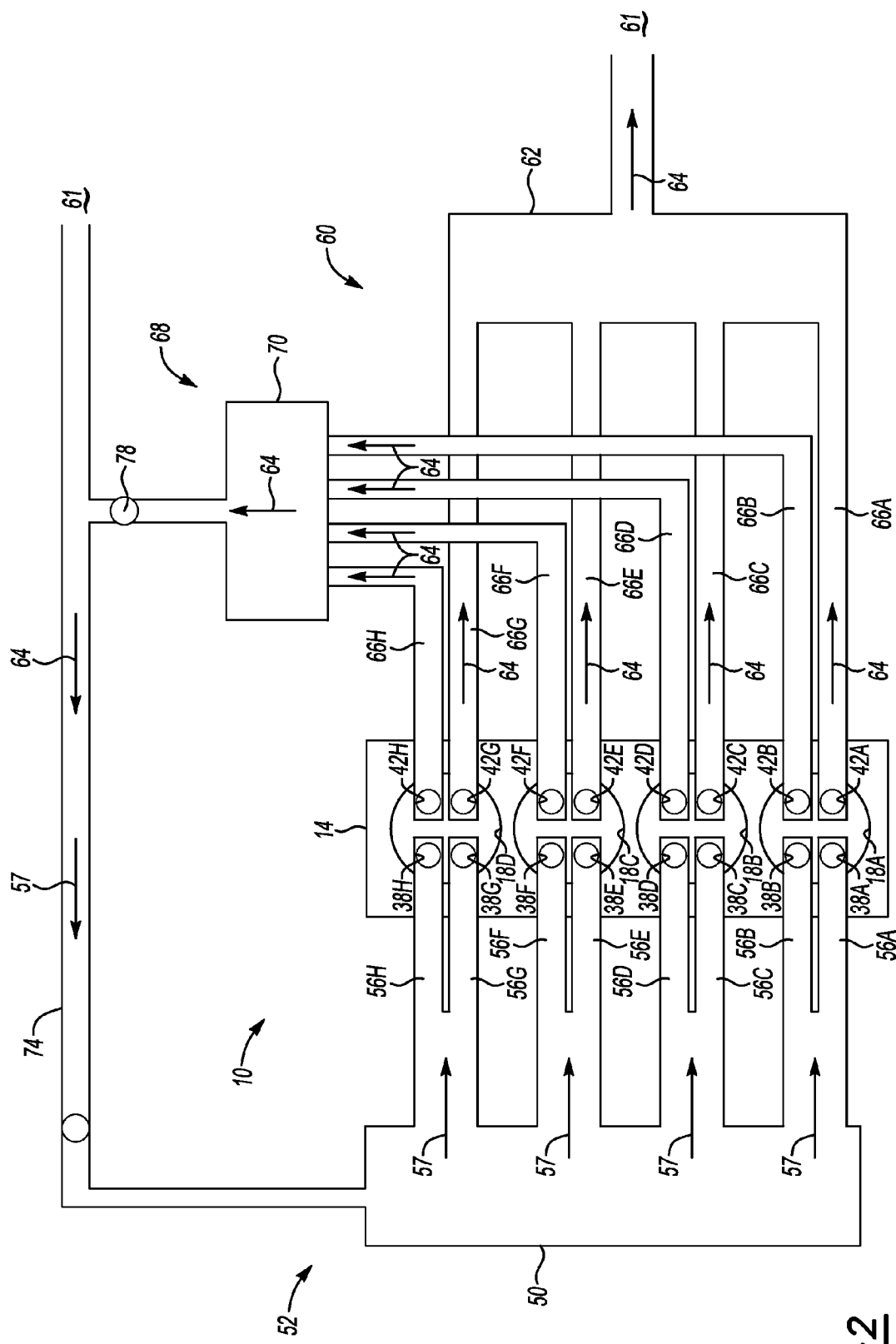
FIG. 2 is a schematic, top view of the engine assembly of FIG. 1 including an air intake system, an exhaust system, and an EGR system applied to all of the engine cylinders.

Each piston 22A-D is operatively connected to a crankshaft (shown at 26 in FIG. 3) via a respective connecting rod (shown at 30 in FIG. 3) such that the reciprocal translation of each piston causes rotation of the crankshaft 26 and vice versa. Each cylinder 18A-D includes one or more (two shown in the embodiment depicted) respective intake ports 38A-H, and two respective exhaust ports 42A-H formed by a cylinder head (shown at 46 in FIG. 3). Referring to FIGS. 1 and 2, each intake port 38A-H is in selective fluid communication with an intake manifold 50 of an air intake system 52 via a respective runner 56A-H to receive an intake charge including air and recirculated exhaust gas.

Each cylinder 18A-D has one or more (two shown in the embodiment depicted) respective intake valves 54A-H associated therewith. Each intake valve 54A-H is movable between an open position in which the cylinder associated with the intake valve is in fluid communication with the intake manifold 50 via its respective intake port 38A-H and runner 56A-H, and a closed position in which the intake valve 54A-H obstructs a respective one of the intake ports 38A-H thereby to prevent fluid communication between the cylinder 18A-D associated with the intake valve and the air intake system 52. Thus, air flow 57 from the intake manifold 50 into each of the cylinders 18A-D is controlled by one or more intake valves 54A-H.

In the embodiment depicted, each cylinder 18A-D has one exhaust port 42A, 42C, 42E, 42G that is in selective fluid communication with an exhaust system 60 configured to convey a portion of the exhaust gases 64 produced in the cylinders 18A-D to the atmosphere 61. More specifically, the exhaust system 60 includes an exhaust manifold 62. Each of exhaust ports 42A, 42C, 42E, 42G is in selective fluid communication with the exhaust manifold 62 via a respective runner 66A, 66C, 66E, 66G. Fluid entering the exhaust manifold 62 is directed to the atmosphere 61. The exhaust system 60 may include other components (not shown), such as exhaust treatment systems (e.g., catalysts) to change the chemical composition of the exhaust gas 64 before it exits the exhaust system 60. If the engine 10 is turbocharged, then the exhaust system may also include a turbine (not shown).

Each cylinder 18A-D also has one exhaust port 42B, 42D, 42F, 42H that is in selective fluid communication with an exhaust gas recirculation (EGR) system 68. The EGR system 68 includes an EGR collector 70 that is in fluid communication with each of exhaust ports 42B, 42D, 42F, 42H via a respective runner 66B, 66D, 66F, 66H. The collector 70 is in selective fluid communication with the air intake system 52. More specifically, the air intake system 52 includes an intake duct 74 that provides fluid communication between the atmosphere 61 and the air intake manifold 50. The EGR collector 70 is in selective fluid communication with the duct 74 such that exhaust gas 64 in the collector 70 can enter the duct 74 and thereafter be transmitted to the intake manifold 50 for induction into the cylinders 18A-D.

In the embodiment depicted, the EGR system 68 includes a one-way valve 78 that permits fluid flow from the collector 70 to the duct 74, but prevents fluid flow from the duct 74 to the collector 70.

Each cylinder 18A-D has two respective exhaust valves 58A-H associated therewith. Each of exhaust valves 58A, 58C, 58E, 58G is movable between an open position in which the cylinder associated with the exhaust valve is in fluid communication with the exhaust manifold 62 via its respective exhaust port 42A, 42C, 42E, 42G, and a closed position in which the exhaust valve 58A, 58C, 58E, 58G obstructs its respective exhaust ports 42A, 42C, 42E, 42G thereby to prevent fluid communication between the cylinder 18A-D associated with the exhaust valve and the exhaust manifold 62.

Each of exhaust valves 58B, 58D, 58F, 58H is movable between an open position in which the cylinder associated with the exhaust valve is in fluid communication with the EGR collector 70 via its respective exhaust port 42B, 42D, 42F, 42H, and a closed position in which the exhaust valve 58B, 58D, 58F, 58H obstructs its respective exhaust ports 42B, 42D, 42F, 42H, thereby to prevent fluid communication between the cylinder 18A-D associated with the exhaust valve and the EGR collector 70.

It should be noted that the EGR system 68 and the exhaust system 60 in the embodiment depicted are separate and distinct systems, and are not coextensive. There is no direct fluid communication between the EGR system 68 and the exhaust system 60. There is no EGR passageway that allows fluid communication (exhaust flow) from the exhaust system 60 to the air intake system 52. Thus, exhaust gas 64 that enters the exhaust system 60 via ports 42A, 42C, 42E, 42G cannot enter the EGR system 68 or the air intake system 52 except through one of the cylinders 18A-D or after being released to the atmosphere 61. Similarly, exhaust gas 64 that enters the EGR system 68 via ports 42B, 42D, 42F, 42H cannot enter the exhaust system 60 without first travelling through the air intake system 52 and/or through one of the cylinders 18A-D. Accordingly, ports 42B, 42D, 42F, 42H are dedicated EGR exhaust ports: exhaust flow through ports 42B, 42D, 42F, 42H is used for EGR and is not directed to the atmosphere without first being recirculated through the engine 10.

The intake valves 54A-H are spring-biased in the closed position. The engine 10 includes intake valve actuators 86A-H, each of the intake valve actuators being configured to selectively cause a respective one of the intake valves 54A-F to move between its open and closed positions. In the embodiment depicted, the actuators 86A-H operatively engage an intake camshaft 90. The exhaust valves 58A-H are also spring-biased in the closed position. The engine 10 includes exhaust valve actuators 94A-H, each being configured to selectively cause a respective one of the exhaust valves 58A-H to move between its open and closed positions. Actuators 94A-H operatively engage an exhaust camshaft assembly 100. Those skilled in the art will recognize a variety of valve actuators that may be employed within the scope of the claimed invention, such as cam-operated rocker arms, cam-operated finger followers, solenoids, etc.

Figure 3:
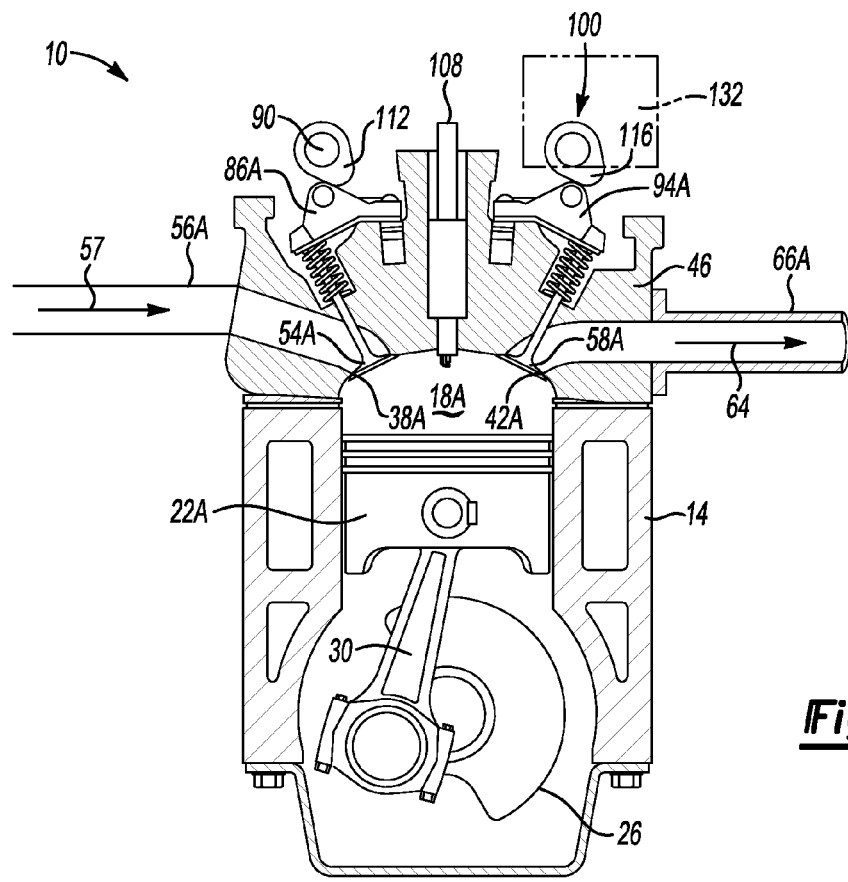
FIG. 3 is a schematic, sectional side view of the engine assembly of FIG. 1.
Figure 4:
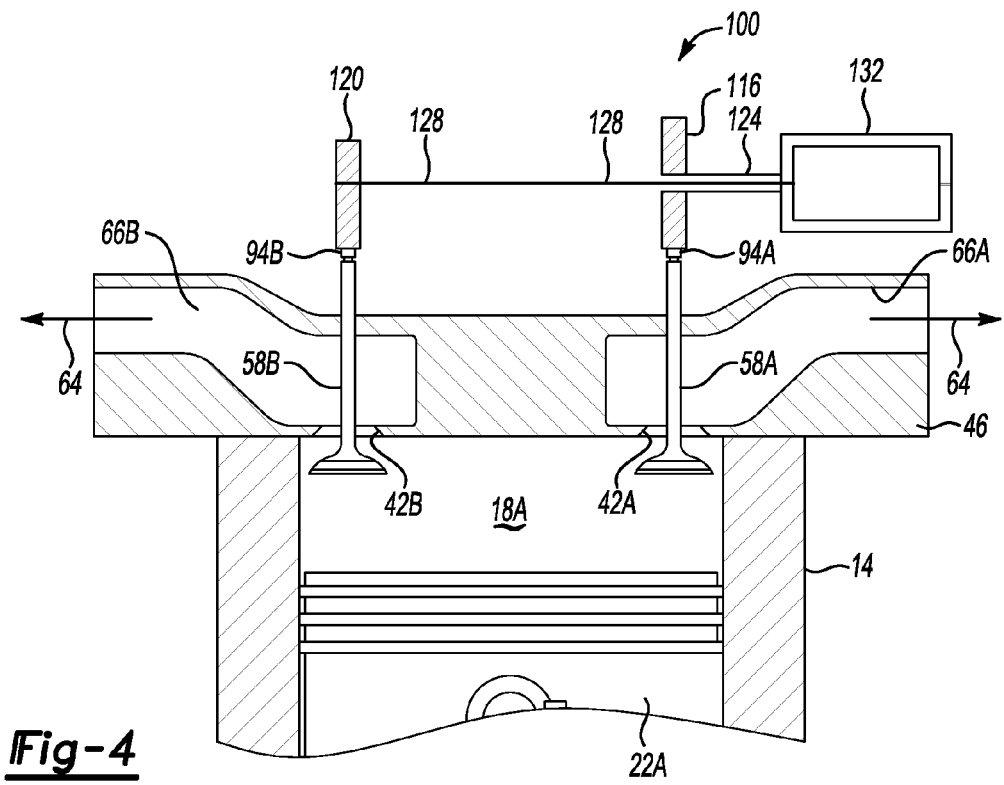
FIG. 4 is another schematic, sectional side view of the engine assembly of FIG. 1.

FIGS. 3 and 4 schematically depict cylinder 18A and the valves 54A, 54B, 58A, 58B associated with the cylinder 18A. It should be noted that cylinder 18A is representative of the other cylinders 18B-D. Referring to FIG. 3, the engine 10 in the embodiment depicted also includes a plurality of spark plugs 108, each configured to provide a spark in a respective one of the cylinders 18A-D. However, compression ignition engines may also be employed within the scope of the claimed invention. Camshaft 90 includes a plurality of intake cams 112 operatively connected thereto for rotation therewith. Each intake cam 112 is engaged with a respective one of the intake valve actuators 86A-H, as understood by those skilled in the art. Camshaft 90 is operatively connected to the crankshaft 26, such as via gears, chain drive, or belt drive, such that the camshaft 90 rotates once for every two rotations of the crankshaft 26. The lobe of cam 112 causes the intake valve 54A to open and close as the camshaft 90 rotates, as understood by those skilled in the art.

Referring to FIGS. 3 and 4, the engine 10 has an engine block 14 defining a cylinder 18A having an intake port 38A, 38B, a first exhaust port 42A, and a second exhaust port 42B. The engine also includes a crankshaft 26, an air intake system (shown at 52 in FIG. 1) in fluid communication with the intake port 38A via runner 56A, an exhaust system (shown at 60 in FIG. 1) in fluid communication with the first exhaust port 42A via runner 66A, and an exhaust gas recirculation system (shown at 68 in FIG. 1) in fluid communication with the second exhaust port 42B via runner 66B. The exhaust gas recirculation system 68 provides fluid communication from the second exhaust port 42B to the air intake system 52, and is not in direct fluid communication with the exhaust system 60, i.e., the exhaust gas recirculation system 68 is not in fluid communication with the exhaust system 60 except via one of the cylinders 18A-D or through the atmosphere 61.

The engine 10 also includes a cam-actuated intake valve 54A configured to control the flow of fluid, i.e., air 57, from the air intake system 52 to the cylinder 18A via intake port 38A. A first cam-actuated exhaust valve 58A is configured to control the flow of fluid, i.e., exhaust 64, from the cylinder 18A to the exhaust system 60 via the first exhaust port 42A. A second cam-actuated exhaust valve 58B is configured to control the flow of fluid, i.e., exhaust 64, from the cylinder 18A to the exhaust gas recirculation system 68 via the second exhaust port 42B.

A first cam 116 is configured to actuate the first cam-actuated exhaust valve 58A. A second cam 120 is configured to actuate the second cam-actuated exhaust valve 58B. The second cam 120 is phase adjustable relative to the crankshaft 26 independently of the phase of the first cam 116 relative to the crankshaft 26.

More specifically, in the embodiment depicted, the camshaft assembly 100 is configured to actuate the first and second exhaust valves 58A, 58B. The camshaft assembly 100 has a first shaft 124 and a second shaft 128. The first shaft 124 and the second shaft 128 are concentrically disposed; the second shaft 128 is disposed within a cylindrical cavity inside the first shaft 124. The first shaft 124 and the second shaft 128 are selectively rotatable relative to one another within a limited range.

The first cam 116 is operatively connected to the first shaft 124 for unitary movement therewith, and the second cam 120 is operatively connected to the second shaft 128 for unitary movement therewith. The engine 10 includes a cam phaser 132 operatively connected to the second cam 120 via the second shaft 128; the cam phaser 132 is configured to selectively adjust the phase relationship of the second cam 120 in relation to the crankshaft 26 independent of the phase relationship of the first cam 116 in relation to the crankshaft.

In the embodiment depicted, cams (not shown) for valves 58D, 58F, 58H are connected to the second shaft 128 for movement therewith, and cams (not shown) for valves 58C, 58E, 58G are connected to the first shaft 124 for movement therewith. Accordingly, adjusting the rotational position of the second shaft 128 relative to the first shaft 124 causes a timing change of exhaust valves in all of the cylinders 18A-D.

However, it should be noted that, within the scope of the claimed invention, less than all of the cylinders 18A-D may include a dedicated EGR exhaust port with independently adjustable valve timing.

Figure 5:
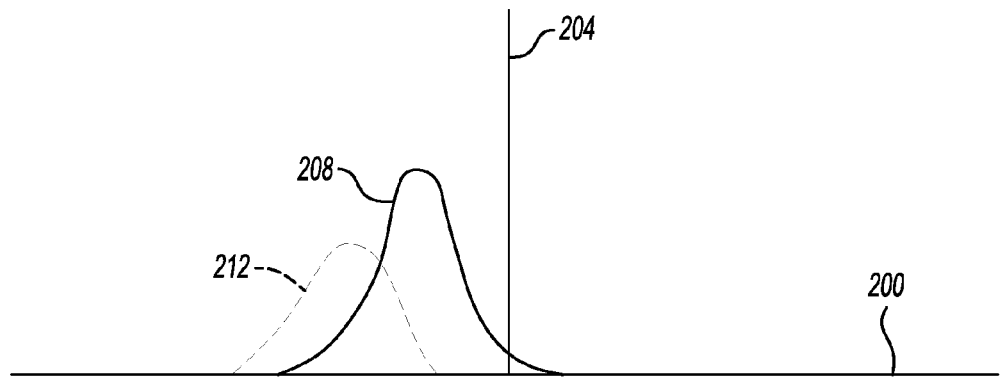
FIG. 5 is a graph depicting valve lift profiles of the exhaust valves of FIG. 4.

Referring to FIG. 5, the valve lift profile 208 for the first exhaust valve 58A and the valve lift profile 212 for the second exhaust valve 58B are graphically depicted as a function of the rotational position of the crankshaft 200 (in crank angle degrees) relative to the top dead center position 204 of the piston 22A. In the embodiment depicted, the second cam 120 has a different size and shape than the first cam 116, and thus the lift profile 212 for the second valve 58B is different from the lift profile for the first valve 58A. However, it should be noted that the second cam 120 and the first cam 116 may have identical sizes and shapes within the scope of the claimed invention. In FIG. 5, the phaser 132 is set such that the second exhaust valve 58B opens before the first exhaust valve 58A, thereby increasing the relative amount of exhaust 64 from the cylinder 18A that is directed to the EGR system 68 relative to the exhaust system 60.

Figure 6:
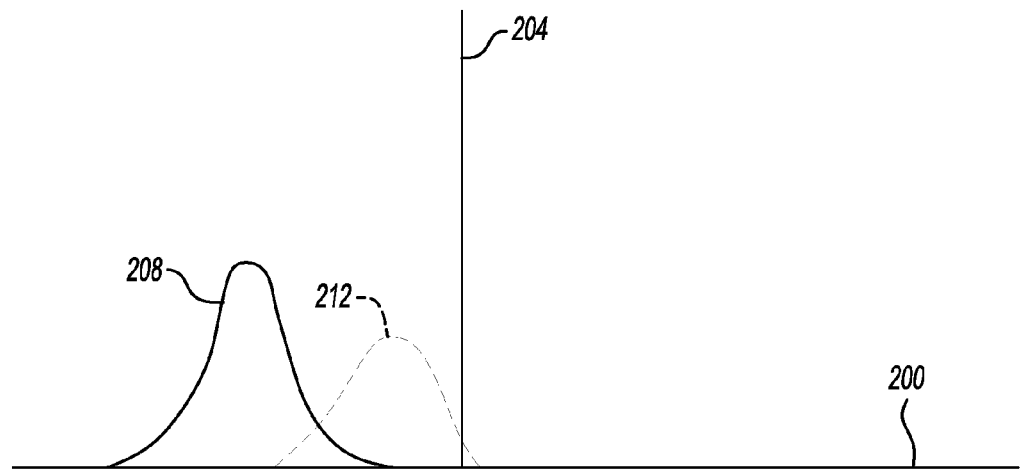
FIG. 6 is a graph depicting valve lift profiles of the exhaust valves of FIG. 4 after phase adjustment.

The relative amount of exhaust 64 that enters the EGR system 68 is selectively variable by varying the timing of the first and second exhaust valves 58A, 58B. Thus, for example, and with reference to FIG. 6, the cam phaser 132 may advance the timing of the first valve 58A so that it has the profile shown at 208 in FIG. 6 and retard the timing of the second valve 58B such that it has the profile shown at 212 in FIG. 6. With the timing shown in FIG. 6, less exhaust gas 64 is sent to the EGR system 68 than to the exhaust system 60 compared to the timing shown in FIG. 5.

While the best modes for carrying out the invention have been described in detail, those familiar with the art to which this invention relates will recognize various alternative designs and embodiments for practicing the invention within the scope of the appended claims.

The invention claimed is:

1. An engine assembly comprising:
an engine block defining a cylinder;
a crankshaft;
an air intake system;
an exhaust system;
an exhaust gas recirculation system;
a cam-actuated intake valve configured to control the flow of fluid from the air intake system to the cylinder;
a first cam-actuated exhaust valve configured to control the flow of fluid from the cylinder to the exhaust system;
a second cam-actuated exhaust valve configured to control the flow of fluid from the cylinder to the exhaust gas recirculation system;
a first cam configured to actuate said first cam-actuated exhaust valve; and
a second cam configured to actuate said second cam-actuated exhaust valve, said second cam being phase adjustable relative to the crankshaft independently of the phase of the first cam relative to the crankshaft;
wherein the second cam is characterized by a different size or shape than the first cam.

2. The engine assembly of claim 1, further comprising a camshaft assembly configured to actuate the first and second exhaust valves;
said camshaft assembly having a first shaft and a second shaft, one of said first shaft and said second shaft being concentrically disposed within the other of the first and second shaft;
said first and second shafts being configured for variable phasing therebetween;
wherein the first cam is operatively connected to the first shaft for unitary movement therewith; and
wherein the second cam is operatively connected to the second shaft for unitary movement therewith.

3. The engine assembly of claim 1, further comprising a cam phaser operatively connected to the second cam and configured to selectively adjust the phase relationship of the second cam in relation to the crankshaft.

4. An engine assembly comprising:
an engine block defining a cylinder having an intake port, a first exhaust port, and a second exhaust port;
a crankshaft;
an air intake system in fluid communication with the intake port;
an exhaust system in fluid communication with the first exhaust port and not in fluid communication with the second exhaust port;
an exhaust gas recirculation system that provides fluid communication from the second exhaust port to the air intake system, and that is not in fluid communication with the first exhaust port;
a first cam-actuated exhaust valve configured to control the flow of fluid through the first exhaust port;
a second cam-actuated exhaust valve configured to control the flow of fluid through the second exhaust port;
a first cam configured to actuate said first cam-actuated exhaust valve; and
a second cam configured to actuate said second cam-actuated exhaust valve, said second cam being phase adjustable relative to the crankshaft independently of the phase of the first cam relative to the crankshaft;
wherein the second cam is characterized by a different size or shape than the first cam.

5. The engine assembly of claim 4, further comprising a camshaft assembly having a first shaft and a second shaft, one of said first shaft and said second shaft being concentrically disposed within the other of the first and second shaft;
said first and second shafts being configured for variable phasing therebetween;
wherein the first cam is operatively connected to the first shaft for unitary movement therewith; and
wherein the second cam is operatively connected to the second shaft for unitary movement therewith.

6. The engine assembly of claim 4, further comprising a cam phaser operatively connected to the second cam and configured to selectively adjust the phase relationship of the second cam in relation to the crankshaft.

7. A method comprising:
providing an engine having a block defining a cylinder having a first exhaust port, a second exhaust port, a first exhaust valve controlling fluid flow through the first exhaust port, a second exhaust valve controlling fluid flow through the second exhaust port, an air intake system, an exhaust system providing fluid communication from the first exhaust port to the atmosphere, an exhaust gas recirculation system providing fluid communication from the second exhaust port to the air intake system, said exhaust gas recirculation system and said exhaust system being separated and not coextensive with one another; and
adjusting the amount of exhaust gas entering the exhaust gas recirculation system by adjusting the timing of the second exhaust valve relative to the first exhaust valve;
wherein the engine includes a crankshaft, a first cam configured to actuate the first exhaust valve and a second cam configured to actuate the second exhaust valve, with the second cam configured in a different size or shape from the first cam which provides a lift profile of the second exhaust valve being different from a lift profile of the first exhaust valve;

wherein said adjusting the timing of the second exhaust valve includes adjusting the phase of the second cam relative to the crankshaft independently of the phase of the first cam relative to the crankshaft.

8. The method of claim 7, wherein adjusting the timing of the second exhaust valve includes opening the second exhaust valve before the first exhaust valve to increase the amount of exhaust gas directed to the exhaust gas recirculation system than to the exhaust system.

9. The method of claim 7, wherein adjusting the timing of the second exhaust valve includes opening the first exhaust valve before the second exhaust valve to increase the amount of exhaust gas directed to the exhaust system than to the exhaust gas recirculation system.

* * * * *